(12) United States Patent
Oroskar et al.

(10) Patent No.: US 10,602,409 B1
(45) Date of Patent: Mar. 24, 2020

(54) DYNAMIC BUFFER ALLOCATION BASED ON SIGNAL DEGRADATION

(71) Applicant: Sprint Spectrum LP, Overland Park, KS (US)

(72) Inventors: Siddharth Oroskar, Overland Park, KS (US); Jasinder Singh, Olathe, KS (US); Nitesh Manchanda, Overland Park, KS (US); Rajil Malhotra, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 75 days.

(21) Appl. No.: 15/049,490

(22) Filed: Feb. 22, 2016

(51) Int. Cl.
*H04W 28/18* (2009.01)
*H04W 72/08* (2009.01)
*H04B 7/26* (2006.01)
*H04W 28/02* (2009.01)
*H04W 84/04* (2009.01)

(52) U.S. Cl.
CPC .......... *H04W 28/18* (2013.01); *H04B 7/2606* (2013.01); *H04W 28/0242* (2013.01); *H04W 28/0247* (2013.01); *H04W 72/085* (2013.01); *H04W 84/047* (2013.01)

(58) Field of Classification Search
None
See application file for complete search history.

(56) References Cited

U.S. PATENT DOCUMENTS

| | | | |
|---|---|---|---|
| 6,259,698 B1 * | 7/2001 | Shin | H04L 29/06 370/395.7 |
| 8,391,859 B1 * | 3/2013 | Pulugurta | H04W 36/0022 370/328 |
| 8,948,006 B2 | 2/2015 | Taneja | |
| 2001/0009014 A1 * | 7/2001 | Savage, III | H04L 29/06027 709/204 |
| 2002/0183026 A1 * | 12/2002 | Naruse | H04L 1/0003 455/134 |
| 2004/0136347 A1 * | 7/2004 | Fuke | H04W 40/02 370/338 |
| 2005/0003865 A1 * | 1/2005 | Lastinger | H01Q 3/2605 455/562.1 |
| 2005/0180323 A1 * | 8/2005 | Beightol | H04L 29/06027 370/230 |
| 2011/0244851 A1 * | 10/2011 | Gunnarsson | H04W 8/26 455/423 |
| 2012/0250605 A1 * | 10/2012 | Du | H04L 47/14 370/315 |
| 2013/0040558 A1 * | 2/2013 | Kazmi | H04W 16/26 455/9 |

* cited by examiner

*Primary Examiner* — Robert M Morlan (57) ABSTRACT

An access node can dynamically adjust a buffer allocation of a wireless device connected thereto, based on a packet loss or other signal degradation characteristic of a wireless link between the access node and the wireless device. The wireless device may be a relay node. The signal degradation may be indicated by a packet loss of data transmitted over the wireless link. Based on the detected signal degradation, the donor access node dynamically and in real-time adjusts a size of a buffer or sub-buffer allocated to the relay node. Threshold comparisons are used to determine when and by how much to adjust the buffer size. Operations are not limited to relay node buffers, and can be applied to buffers associated with standard wireless devices based upon signal characteristics thereof, an application requirement of the devices, or a historical trend of packets losses for the wireless links associated therewith.

18 Claims, 4 Drawing Sheets

DYNAMIC BUFFER ALLOCATION BASED ON SIGNAL DEGRADATION

TECHNICAL BACKGROUND

As wireless networks evolve and grow, there are ongoing challenges in providing high-quality service to increasing numbers of wireless devices or user equipment (UE) in various coverage areas of a wireless network. One approach to improving service quality and coverage is to deploy small access nodes, such as mini-macro access nodes, that are configured to function as relay nodes for relaying communication from a macro base station or eNodeB, that functions as a donor access node, to an end-user wireless device. Relay nodes may be used at the edge of a coverage area of a donor access node to improve coverage and/or service, as well as in crowded areas having a high number of other wireless devices to increase the available throughput to the end-user wireless devices being relayed.

Currently, donor access nodes are limited in their ability to distinguish a relay node from a standard wireless device attached to the donor access node and, therefore, allocate the same default buffer size to all devices connected thereto. However, the buffer allocation of the relay node can get overwhelmed due to the number and/or bandwidth requirements of end-user wireless devices attached to the relay node, particularly when the default buffer allocation is sized for standard wireless devices. This can cause packet losses and other signal degradation on the backhaul link between the relay node and the donor access node, thereby reducing the quality of service (QoS) for end-user wireless devices attached to the relay node.

Overview

Exemplary embodiments described herein include systems, methods, and processing nodes for dynamic buffer allocation based on signal degradation. A method for dynamic buffer allocation includes monitoring a degradation of a wireless link between the wireless device and an access node, and adjusting the buffer allocation size of a buffer associated with the wireless device based in part on the degradation. The buffer is stored on the access node.

A system for dynamic buffer allocation includes a donor access node for providing network services to an end-user wireless device via a relay node, and a processor communicatively coupled to the donor access node. The processor configures the donor access node to execute operations including determining a presence of the relay node, and monitoring a backhaul link of the relay node for a degradation. The backhaul link is a wireless connection between the relay node and the donor access node. Upon determining a change in the degradation, the donor access node correspondingly adjusts a size of a buffer allocated to the relay node.

A processing node for dynamic buffer allocation includes a processor that enables the processing node to perform operations including determining a degradation in a wireless signal between an access node and a wireless device attached to the access node, and adjusting a buffer allocation size of a downlink buffer associated with the wireless device based on the degradation. The buffer allocation size is increased or decreased proportionally as the degradation increases or decreases past a plurality of thresholds.

DETAILED DESCRIPTION

In embodiments disclosed herein, an access node can dynamically adjust a buffer allocation of a wireless device connected thereto, based on a packet loss or other signal characteristic of a wireless link between the access node and the wireless device. The wireless device may be a relay node. For example, when a relay node accesses the wireless network via the access node, i.e., a donor access node, the donor access node determines that the relay node is relaying services to multiple end-user wireless devices that attach to the relay node. The donor access node then monitors the wireless link between itself and the relay node to determine whether or not there is any signal degradation indicated by, for instance, a packet loss of data transmitted over the wireless link. Based on the detected signal degradation, the donor access node dynamically and in real-time adjusts a size of a buffer or sub-buffer allocated to the relay node. The buffer size can be increased to an amount greater than a default buffer size that is typically allocated for standard wireless devices. Threshold comparisons may be used to determine when and by how much to adjust the buffer size. For example, if the packet losses exceed a threshold, the buffer size may be increased by a predefined amount. Similarly, if the packet losses fall below a threshold, the buffer size may be decreased accordingly. A hysteresis threshold may be used to determine when to increase or decrease the buffer size.

As the signal degradation of the wireless link of the relay node (i.e. backhaul link) may be indicative of an increased demand of end-user wireless devices connected to the relay node and requesting services therefrom, increasing the relay node's buffer size at the donor access node can mitigate packet loss for data intended to be transmitted to said end-user wireless devices. Moreover, these operations are not limited to relay node buffers, and can be applied to buffers associated with standard wireless devices based upon signal characteristics thereof, an application requirement of the devices, or a historical trend of packets losses for the wireless links associated therewith. These and additional operations are further described with respect to the embodiments depicted in FIGS. 1-4 below.

Figure 1:
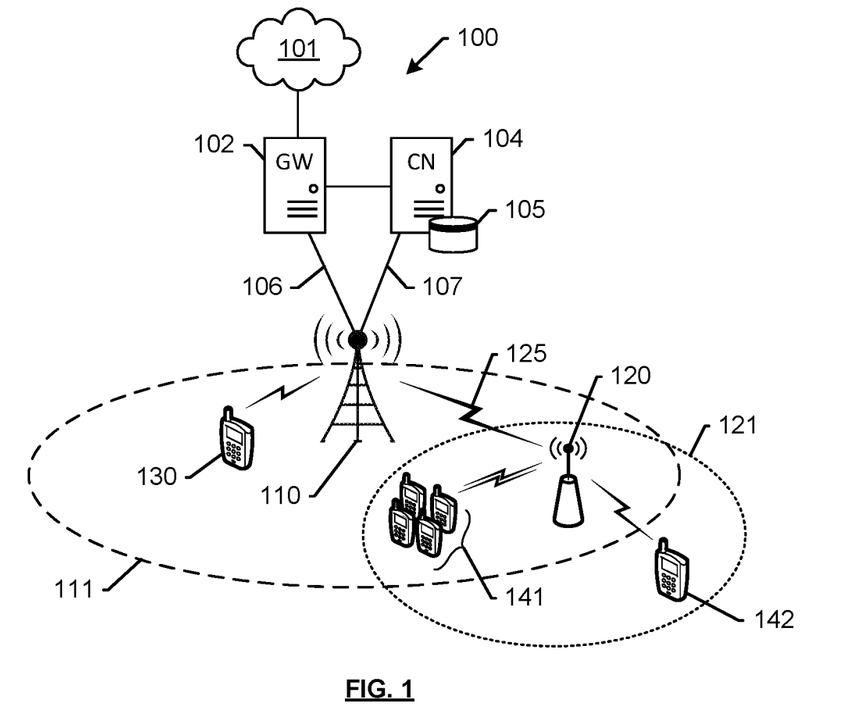
FIG. 1 depicts an exemplary system for dynamic buffer allocation.

FIG. 1 depicts an exemplary system 100 for dynamic buffer allocation. System 100 comprises a communication network 101, gateway 102, controller node 104, access node 110, relay node 120, and end-user wireless devices 130, 141, and 142. Access node 110 is illustrated as having coverage area 111, and relay node 120 is illustrated as having coverage area 121. End-user wireless device 130 is located within coverage area 111 and accesses network services directly from access node 110 via an air interface deployed by access node 110. End-user wireless devices 141 are located within both coverage areas 111 and 121, and are able to access network services from either access node 110 or from relay access node 120. Relay access node 120 is located within coverage area 111, and is configured to relay network services and data between access node 110 and one or more of wireless devices 141, 142. In other words, relay node 120 is acts as a wireless access point for end-user wireless device 142 and communicates with access node 110 via air interface 125, hereinafter referred to as a relay backhaul air interface, or simply "backhaul". Thus, access node 110 may be referred to as a donor access node, and wireless device 142, which is outside coverage area 111, can still access network services from donor access node 110 by virtue of being within coverage area 121 of relay node 120.

In operation, donor access node 110 can dynamically adjust a buffer allocation of any device connected thereto, including relay node 120, based on a packet loss or other signal characteristic of a wireless link between the access node and the device. For example, when relay node 120 accesses network 101 via donor access node 110, donor access node 110 determines that relay node 120 is relaying services to one or more end-user wireless devices, such as end-user wireless devices 141 and 142, which are attached to relay node 120. Donor access node 110 then monitors backhaul 125 to determine whether or not there is any signal degradation, which may be indicated by a packet loss of data transmitted over the backhaul 125, or any other signal degradation metric, such as an error rate, retransmission rate, etc. Based on the detected signal degradation, donor access node 110 dynamically and in real-time adjusts a size of a buffer allocated to relay node 120. The buffer can be a sub-buffer, i.e. a portion of a downlink buffer stored on access node 110 that is allocated to relay node 120. In some embodiments, the buffer size can be adjusted to an amount greater than a default buffer size that is typically allocated for standard wireless devices, such as end-user wireless device 130. Threshold comparisons may be used to determine when and by how much to adjust the buffer size. For example, if the packet losses on backhaul 125 exceed a threshold, the buffer size may be increased by a predefined amount. Similarly, if the packet losses fall below a threshold, the buffer size may be decreased accordingly. As the signal degradation of backhaul 125 may be indicative of an increased demand of end-user wireless devices 141, 142 connected to relay node 120 and requesting services therefrom, increasing the size of the buffer allocated for relay node 120 can mitigate data losses and other types of signal degradation. Moreover, these operations are not limited to sub-buffers of relay node 110, and can be applied to sub-buffers associated with other devices, such as end-user wireless device 130. For instance, a sub-buffer portion of a downlink buffer that is associated with end-user wireless device 130 may be adjusted based upon degradation characteristics of the wireless link thereof. Moreover, other factors may be considered in determining how to adjust a buffer allocation of end-user wireless device 130, such as an application requirement of an application running on end-user wireless device 130. A historical trend of packets losses for the either end-user wireless device 130 or relay node 120 may be referred to in determining a buffer allocation.

In an embodiment, relay node 120 can be set up as one or more of a layer 1 (L1), layer 2 (L2), or layer 3 (L3) relay. A layer 1 relay functions as a booster or repeater. In other words, a layer 1 relay device performs an amplify and forward (AF) function. RF signals received from donor access node 110 are amplified and transmitted respectively by relay node 120 to wireless devices 141, 142. Likewise, RF signals received from wireless devices 141, 142 are amplified and transmitted by relay node 120 respectively to donor access node 110. Alternatively or in addition, a layer 2 relay device performs a decode and forward (DF) function. RF signals received from donor access node 110 are demodulated and decoded, then encoded and modulated again before being transmitted by relay node 120 to wireless devices 141, 142. Likewise, RF signals received from wireless devices 141, 142 are demodulated and decoded, then encoded and modulated again before being transmitted by relay node 120 to donor access node 110. Alternatively or in addition, a layer 3 relay device also performs a decode and forward function. However, a layer 3 relay device also performs additional processing (such as ciphering and/or data concatenation/segmentation/resassembly). In other words, relay node 120 performs demodulation and decoding of the received RF signals (either uplink or downlink), processes received data, then encodes, modulates, and transmits the data to wireless devices 141, 142.

Wireless devices 130, 141, 142 may be any device, system, combination of devices, or other such communication platform capable of communicating wirelessly with relay node 120 or access node 110 using one or more frequency bands deployed therefrom. Wireless devices 130, 141, 142 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access node 110 or relay node 120. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 130, 141, 142, etc. Wireless network protocols can comprise MBMS, code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Communications links 106, 107 may include Si communications links. Other wireless protocols can also be used. Communication links 106, 107 can be a direct link or might include various equipment, intermediate components, systems, and networks. Communication links 106, 107 may comprise many different signals sharing the same link Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing access node characteristics, such as public land mobile network (PLMN) identifiers of access node 110 and relay node 120, as well as information about end-user wireless devices 130, 141, 142. This information may be requested by or shared with access node 110 via connections 106, 107, X2 connections, and so on. The software comprises computer programs, firmware, or some other form of machine-readable instructions, and may include an operating system, utilities, drivers, network interfaces, applications, or some other type of software, and combinations thereof. Controller node 107 can receive instructions and other input at a user interface.

Access node 110 and relay node 120 can be any network node configured to provide communication between wireless devices 130, 141, 142 and communication network 101, including standard access nodes and/or short range, low power, small access nodes. For instance, access node 110 may include any standard access node, such as a macrocell access node, base transceiver station, a radio base station, an eNodeB device, an enhanced eNodeB device, or the like. In an exemplary embodiment, a macrocell access node can have a coverage area 111 in the range of approximately five kilometers to thirty five kilometers and an output power in the tens of watts. Relay node 120 can be a small access node including a microcell access node, a picocell access node, a femtocell access node, or the like such as a home NodeB or a home eNodeB device. Moreover, it is noted that while access node 110 and relay node 120 are illustrated in FIG. 1, any number of access nodes and relay nodes can be implemented within system 100.

Access node 110 and relay node 120 can comprise a processor and associated circuitry to execute or direct the execution of computer-readable instructions to obtain information as further described with reference to FIG. 2. Briefly, access node 110 and relay node 120 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 and relay node 120 can receive instructions and other input at a user interface. Access node 110 communicates with gateway node 102 and controller node 104 via communication links 106, 107. Access nodes 110 may communicate with other access nodes using a direct link such as an X2 link or similar.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101

Figure 2:
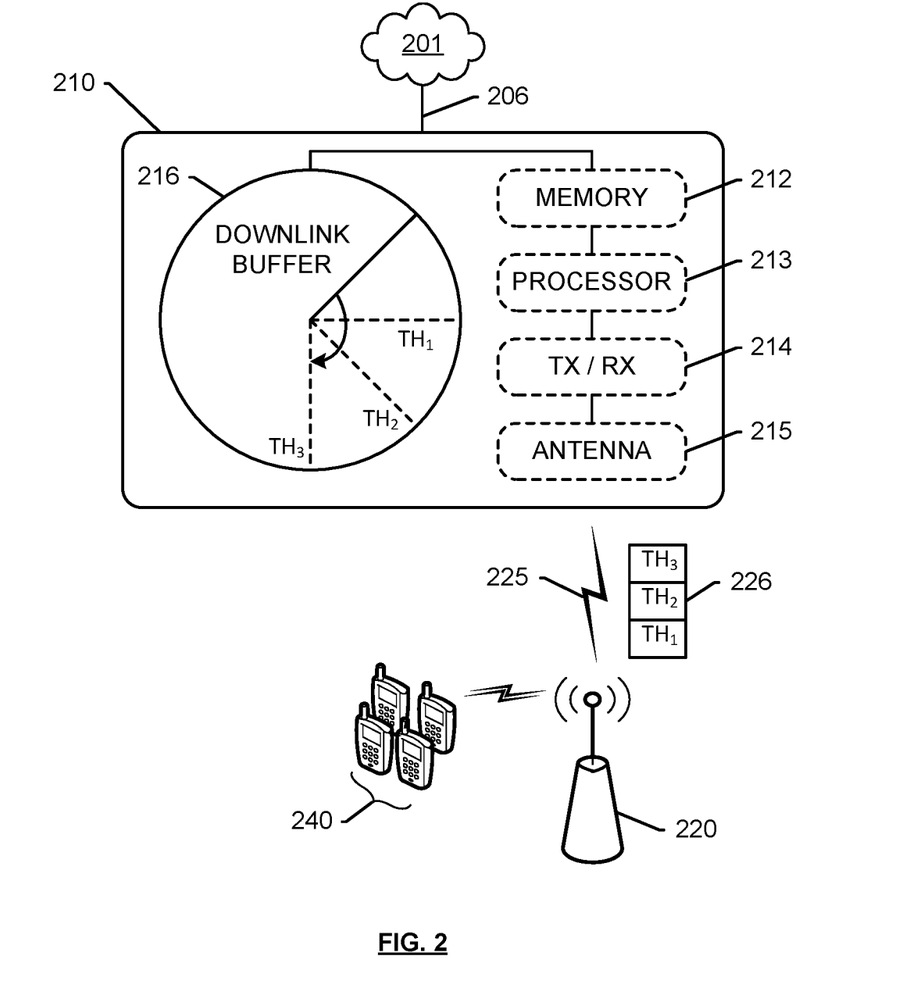
FIG. 2 depicts an exemplary access node for performing dynamic buffer allocation operations.

FIG. 2 depicts an exemplary access node 210 for performing dynamic buffer allocation operations. Access node 210 may be a macro-cell access node as described above, or a small-cell access node, such as a relay node. In this embodiment, access node 210 is a macro-cell access node that is configured as a donor for relay node 220 using backhaul air interface 225, thereby providing network services to end-user wireless devices 240 via relay node 220. Access node 210 is illustrated as comprising a memory 212 for storing logical modules including dynamic buffer allocation operations described herein, a processor 213 for executing the logical modules, a transceiver 214, and an antenna 215 for communication with relay node 220 and other end-user wireless devices (not shown). Further, access node 210 is communicatively coupled to network 201 via communication interface 206, which may include additional components connected via any wired or wireless link as described above. For instance, if access node 210 is a macro, then there may be gateways and/or controllers in a path of communication interface 206. If access node 210 is a relay, then there may be additional access nodes in path 206. Moreover, although only one transceiver and antenna combination is depicted in access node 210, additional transceivers and antennas may be incorporated in order to deploy multiple frequency bands and to facilitate communication across other network nodes that are not shown, such as gateways, controllers, and other access nodes.

In operation, access node 210 can dynamically adjust a buffer allocation for relay node 220, by allocating portions of downlink buffer 216 stored thereon, based on threshold increases or decreases of a signal degradation characteristic 226 of backhaul 225 between access node 210 and relay node 220. When relay node 220 accesses network 201 via donor access node 210, donor access node 210 determines that relay node 220 is relaying services to one or more end-user wireless devices 240. This determination may be based upon a unique PLMN of relay node 220 that is different from PLMNs assigned to other devices. Donor access node 210 then monitors backhaul 225 to determine whether or not there is any signal degradation, which may be indicated by one or more of a packet loss of data transmitted over backhaul 225, an error rate, retransmission rate, or any other signal degradation metric. Based on the detected signal degradation, donor access node 210 dynamically and in real-time adjusts an allocation of downlink buffer 216 for relay node 220.

Threshold comparisons may be used to determine when and by how much to adjust the buffer size. For example, as packet losses on backhaul 225 cross (by either increasing past or decreasing below) thresholds $TH_1$, $TH_2$, or $TH_3$ 226, the buffer allocation is adjusted by predefined amounts corresponding to each threshold. The buffer allocation can begin with a default size within downlink buffer 216, and adjustment can be triggered by one or more of detecting the presence of relay node 220, an application requirement, or other inputs. Consequently, the allocation of downlink buffer 216 for relay node 220 is adjusted dynamically and in real-time based upon signal degradation caused by shifts in demand of end-user wireless devices 240 that are attached to relay node 220. Moreover, historical trends of degradation information, such as average or total packets losses over a period of time, may be factored into adjustment of buffer allocations upon detecting the presence of relay node 220 or service requests therefrom.

Figure 3:
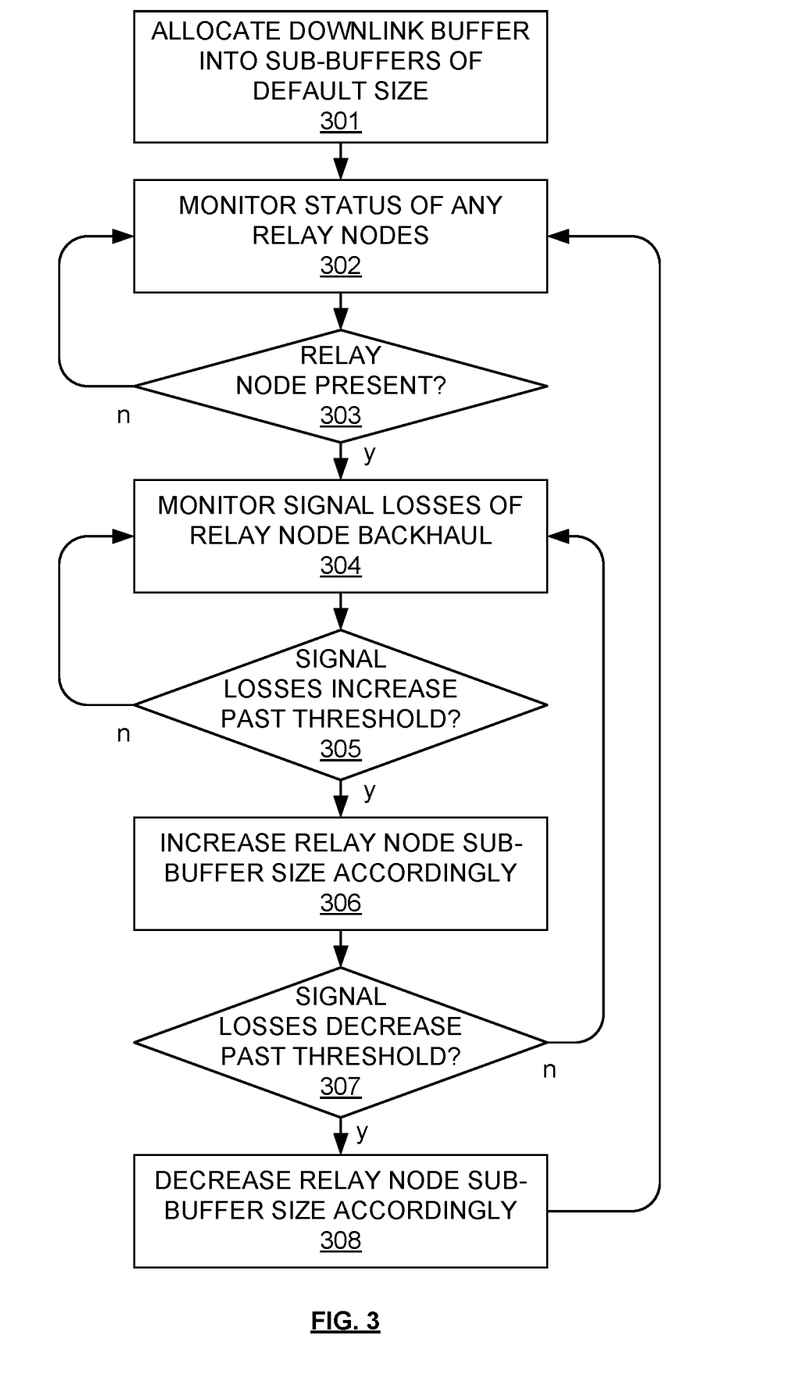
FIG. 3 depicts an exemplary method for dynamic buffer allocation.

FIG. 3 depicts an exemplary method for performing dynamic buffer allocation. The method of FIG. 3 is illustrated with respect to any network node such as a currently-serving access node or relay node. In other embodiments, the method can be implemented with any suitable network element. Although FIG. 3 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 301, a downlink buffer at an access node, such as a donor macro access node, is allocated into a plurality of sub-buffers of a default size, based at least on a number of devices attached to the access node. The default allocation can be of a predefined size and may vary depending upon the system in which the method is implemented. At 302 and 303, a presence of any relay nodes is monitored. Monitoring 302 includes parsing a message received from a wireless device to obtain the PLMN information of the device. If the PLMN is different from a standard wireless device, or if the PLMN matches a unique PLMN dedicated for relay services, then it can be inferred that a relay node has transmitted the message. Further, the message may be a connection request. For example, when a relay node accesses the wireless network, the relay node signals to the donor access node that it is a relay that is intended to provide services to multiple end-user wireless devices. The indication can also include a buffer status report, or a short buffer status report wherein the size field of the short buffer status report is indicative of whether or not the device is functioning as a relay node. The message may also include a scheduling request that communicates to the donor access node that the relay node is asking for an allocation of air-interface resources. In response, the donor access node schedules resources for the relay node.

Then, at 304, signal losses or degradation of the backhaul signal of the relay node are monitored, so as to dynamically adjust buffer allocations of a sub-buffer associated with the relay node. The degradation may be measured based on one or more of a packet loss of data transmitted over the backhaul, an error rate such as a packet error rate (PER) or bit error rate (BER), a retransmission rate based on, for instance, a hybrid automatic repeat request (HARQ), or any other signal degradation metric. For example, if additional end-user wireless devices are attaching to the relay node, an amount of data transmitted to said end-user wireless devices via the relay node may be too large to be contained within the buffer, and can result in errors. The signal degradation may not necessarily be a result of a number of additional devices; it may also be based on the usage requirement of the attached wireless devices, or an application requirement thereof. Threshold increases of the signal degradation metric are monitored in 304 and 305, and the sub-buffer size is correspondingly increased in 306. Increasing the sub-buffer size can comprise allocating larger portions of a downlink buffer based on predefined amounts corresponding to each threshold. Consequently, larger amounts of data may be transmitted to end-user wireless devices attached to the relay node.

Further, in 307-308, it is determined that the signal losses are decreasing beyond a threshold. This may be a result of the increased buffer size, thereby ensuring that the method is successful. However, it is possible that fewer end-user wireless devices are attached to the relay node, or the attached devices have low traffic usage. Thus, if the signal degradation is decreased past a second threshold, or a threshold plus a hysteresis amount, the method moves into the buffer reduction step 308. Upon reducing the sub-buffer size, the method continues to monitor the status of relay nodes in 302 and signal losses thereof in 304. Consequently, the buffer allocation for the relay node is adjusted dynamically and in real-time based upon signal degradation caused by shifts in demand of end-user wireless devices that are attached to the relay node. The method is not necessarily limited to relay nodes and can be applied to any wireless device connected to a macro access node. In some embodiments, an application requirement on an end-user wireless device, whether or not it is attached to the relay node, can trigger an increase in the downlink buffer size associated with the end-user wireless device. Moreover, historical trends of degradation information, such as average or total packets losses over a period of time, may be factored into adjustment of buffer allocations.

The methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: access nodes 110, 210, relay node 120, wireless devices 130, 141, 142, and/or network 101.

Figure 4:
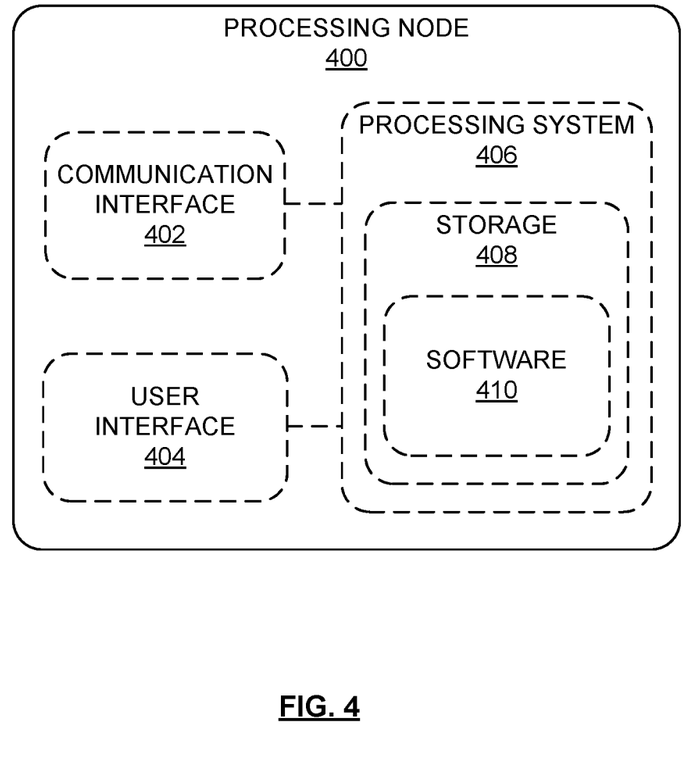
FIG. 4 depicts an exemplary processing node for performing dynamic buffer allocation operations.

FIG. 4 depicts an exemplary processing node 400 comprising a communication interface 402, user interface 404, and processing system 406 in communication with communication interface 402 and user interface 404. Processing system 406 includes storage 408, which can comprise a disk drive, flash drive, memory circuitry, or other memory device. Storage 408 can store software 410 which is used in the operation of the processing node 400. Storage 408 may include a disk drive, flash drive, data storage circuitry, or some other memory apparatus. For example, storage 408 may include a buffer. Software 410 may include computer programs, firmware, or some other form of machine-readable instructions, including an operating system, utilities, drivers, network interfaces, applications, or some other type of software. For example, software 410 may include a buffer allocation module. Processing system 406 may include a microprocessor and other circuitry to retrieve and execute software 410 from storage 408. Processing node 400 may further include other components such as a power management unit, a control interface unit, etc., which are omitted for clarity. Communication interface 402 permits processing node 400 to communicate with other network elements. User interface 404 permits the configuration and control of the operation of processing node 400.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for adjusting a buffer allocation size associated with a relay node, the method comprising:
   determining, by a processor coupled to an access node, a presence of a relay node attached to the access node; and
   responsive to determining the presence of the relay node, adjusting, by the processor, a buffer allocation size of a buffer associated with the relay node based on a degradation of a wireless link between the relay node and the access node, wherein the degradation is based on a number of end-user wireless devices communicating with the access node via the relay node, and wherein the buffer is stored on the access node;
   responsive to determining an increase in the degradation by a first threshold amount, increasing the buffer allocation size; and
   responsive to determining a decrease in the degradation by a second threshold amount, the second threshold amount comprising a sum of the first threshold amount and a hysteresis threshold amount, reducing the buffer allocation size.

2. The method of claim 1, further comprising determining a presence of the relay node based on a unique public land mobile network (PLMN) identifier associated with the relay node.

3. The method of claim 1, further comprising determining a presence of the relay node based on a message received from the relay node, the message indicating a relay node status.

4. The method of claim 1, further comprising:
   monitoring the degradation of the wireless link between the relay node and the access node;
   determining that the degradation of the wireless link changes beyond a threshold; and
   adjusting the buffer allocation size of the buffer by a predefined amount, the predefined amount corresponding to the threshold.

5. The method of claim 4, wherein monitoring the degradation of the wireless link comprises determining a number of packet losses that occur in the wireless link.

6. The method of claim 5, wherein determining that the degradation changes beyond the threshold comprises determining an increase in the number of packet losses by a threshold amount.

7. The method of claim 6, wherein the buffer allocation size is increased by the predefined amount upon determining that the number of packet losses has increased beyond the threshold amount.

8. The method of claim 5, wherein determining that the degradation changes beyond the threshold comprises determining a decrease in the number of packet losses by a threshold amount.

9. The method of claim 8, wherein the buffer allocation size is decreased by the predefined amount upon determining that the number of packet losses has decreased beyond the threshold amount.

10. A system for adjusting a buffer allocation size, the system comprising:
    a donor access node configured to provide wireless services to an end-user wireless device via a relay node; and
    a processor communicatively coupled to the donor access node, the processor for configuring the donor access node to execute operations comprising:
       determining a presence of the relay node; and responsive to determining the presence of the relay node, adjusting a size of a buffer allocated to the relay node based on a degradation of a backhaul link between the relay node and the donor access node, wherein the degradation is based on a number of end-user wireless devices communicating with the access node via the relay node, and wherein the buffer is stored on the access node;

responsive to determining an increase in the degradation by a first threshold amount, increasing the size of the buffer; and responsive to determining a decrease in the degradation by a second threshold amount, the second threshold amount comprising a sum of the first threshold amount and a hysteresis threshold amount, reducing the size of the buffer.

11. The system of claim 10, wherein the degradation is one or more of: a number of packet losses, a packet error rate, or a retransmission rate.

12. The system of claim 10, wherein the buffer is a portion of a downlink buffer stored on the donor access node.

13. The system of claim 12, wherein the buffer is set to a default size prior to determining the change in the degradation.

14. The system of claim 10, wherein the operations further comprise:

increasing the size of the buffer by a first predefined amount when the degradation increases beyond a first threshold; and reducing the size of the buffer by a second predefined amount when the degradation decreases beyond a second threshold.

15. A processing node for adjusting a buffer allocation size associated with a relay node, the processing node being coupled to an access node and configured to perform operations comprising:

determining a presence of a relay node attached to an access node, wherein the relay node is configured to relay services between the access node and a plurality of end-user wireless devices attached to the relay node; and responsive to determining the presence of the relay node, adjusting a buffer allocation size of a downlink buffer associated with the relay node based on a degradation in a wireless signal between the access node and the relay node, wherein the degradation is based on a number of end-user wireless devices communicating with the access node via the relay node, and wherein the downlink buffer is stored on the access node;

responsive to determining an increase in the degradation by a first threshold amount, increasing the size of the downlink buffer; and responsive to determining a decrease in the degradation by a second threshold amount, the second threshold amount comprising a sum of the first threshold amount and a hysteresis threshold amount, reducing the size of the downlink buffer.

16. The processing node of claim 15, wherein the operations further comprise determining a presence of the relay node based on a short buffer status report received from the relay node, wherein a size field of the short buffer status report is indicative of whether or not a wireless device is functioning as the relay node.

17. The processing node of claim 16, wherein the buffer allocation size is increased or decreased by predefined amounts as the degradation increases or decreases past a plurality of thresholds, the predefined amounts being associated with the plurality of thresholds.

18. The processing node of claim 15, wherein the degradation is further indicative of a load on the relay node caused by the plurality of end-user wireless devices.

* * * * *